United States Patent
Kim et al.

(10) Patent No.: US 9,438,098 B2
(45) Date of Patent: Sep. 6, 2016

(54) APPARATUS AND METHOD FOR CONTROLLING MODULE SWITCHING OF POWER CONVERTING SYSTEM

(71) Applicant: HYOSUNG CORPORATION, Anyang-si, Gyeonggi-do (KR)

(72) Inventors: June-Sung Kim, Anyang-si (KR); Jong-Yun Choi, Hwaseong-si (KR)

(73) Assignee: HYOSUNG CORPORATION, Anyang-si, Gyeonggi-do (KR)

( * ) Notice: Subject to any disclaimer, the term of this patent is extended or adjusted under 35 U.S.C. 154(b) by 73 days.

(21) Appl. No.: 14/364,494

(22) PCT Filed: Dec. 12, 2012

(86) PCT No.: PCT/KR2012/010786
§ 371 (c)(1),
(2) Date: Jun. 11, 2014

(87) PCT Pub. No.: WO2013/089425
PCT Pub. Date: Jun. 20, 2013

(65) Prior Publication Data
US 2014/0376288 A1    Dec. 25, 2014

(30) Foreign Application Priority Data

Dec. 12, 2011 (KR) .................. 10-2011-0133006

(51) Int. Cl.
*H02M 5/45* (2006.01)
*H02M 7/48* (2007.01)
(Continued)

(52) U.S. Cl.
CPC ............. *H02M 1/081* (2013.01); *H02M 1/082* (2013.01); *H02M 1/088* (2013.01); *H02M 1/0845* (2013.01); *H02M 7/483* (2013.01); *H02M 2001/007* (2013.01); *H02M 2007/4835* (2013.01)

(58) Field of Classification Search
CPC .. H02M 1/081; H02M 1/084; H02M 1/0845; H02M 1/088
USPC .............................. 363/34, 37, 71, 72, 77–79
See application file for complete search history.

(56) References Cited

U.S. PATENT DOCUMENTS

| 2011/0018481 | A1* | 1/2011 | Hiller | H02M 7/483 318/400.26 |
| 2011/0222323 | A1* | 9/2011 | Dofnas | H02M 7/483 363/71 |
| 2011/0235221 | A1* | 9/2011 | Vogeli | H02M 1/32 361/18 |

FOREIGN PATENT DOCUMENTS

| EP | 0977348 A2 | 2/2000 |
| KR | 100716310 B1 | 5/2007 |

(Continued)

*Primary Examiner* — Adolf Berhane
*Assistant Examiner* — Gary Nash
(74) *Attorney, Agent, or Firm* — Novick, Kim & Lee, PLLC; Jae Youn Kim

(57) ABSTRACT

A technology is disclosed for controlling switching of power converters included in a power converting system. Phase angles are allocated to a plurality of sub-units corresponding to the power converters, and the respective sub-units create local switching carriers based on the allocated phase angles. The sub-units compare a reference AC voltage with the local switching carriers, and switch the power converters according to the result of the comparison.

15 Claims, 4 Drawing Sheets

(51) Int. Cl.
*H02M 7/757* (2006.01)
*H02M 1/08* (2006.01)
*H02M 7/483* (2007.01)
*H02M 1/084* (2006.01)
*H02M 1/088* (2006.01)
*H02M 1/00* (2006.01)

(56) References Cited

FOREIGN PATENT DOCUMENTS

| KR | 10-2010-0094561 A | 8/2010 |
| KR | 10-2010-0095460 A | 8/2010 |

* cited by examiner

APPARATUS AND METHOD FOR CONTROLLING MODULE SWITCHING OF POWER CONVERTING SYSTEM

BACKGROUND OF THE INVENTION

1. Field of the Invention

The present invention relates to a technology for controlling a power converting system, and more particularly, to a technology for controlling the switching of power converters included in a power converting system.

2. Description of the Prior Art

A multilevel converter may be used to convert direct current into alternating current, or alternating current into direct current. The multilevel converter in which a plurality of power converters are connected in series with each other precisely control operating time points or switching time points of the power converters to convert direct current into alternating current, or alternating current into direct current.

The switching of the serially connected power converters is controlled depending on an input waveform, and outputs of the respective power converters are summed up according to the switching time points of the power converters to configure an output waveform. Accordingly, the technology for precisely controlling the switching time points of the respective power converters is emerging as a major issue in the commercialization of the multilevel converter.

With an increase in the number of power converters included in the multilevel converter, a performance improvement such as reduction of high frequency distortion of the output waveform can be made. However, with the increase in the number of power converters, an algorithm for precisely controlling the switching time points of the respective power converters is complicated.

SUMMARY OF THE INVENTION

An aspect of the present invention is to provide an apparatus and a method for converting power which can precisely control switching time points of power converters included in a multilevel converter.

Another aspect of the present invention is to provide an apparatus and a method for converting power which can control switching time points of power converters included in a multilevel converter only with a small amount of operation.

In accordance with one aspect of the present invention, an apparatus for converting power is provided. The apparatus includes: a central controller that generates a reference AC voltage; and a plurality of sub-units, wherein the central controller allocates phase angles to the respective sub-units, and the respective sub-units individually create local switching carriers based on the allocated phase angles, and controls switching of power converters corresponding to the respective sub-units according to a result of a comparison of the individually created local switching carriers and the reference AC voltage.

The power converters may configure at least one phase leg, and, when M power converters are included in the phase leg, the central controller may allocate the phase angles such that differences between the allocated phase angles are multiples of 2π/M.

The power converters included in the phase leg may be connected in series with each other.

The phase leg may be arranged between a DC connection terminal and an AC connection terminal.

The respective sub-units may compare the local switching carriers with the reference AC voltage, and may control the switching of the power converters corresponding to the respective sub-unit according to the result of the comparison.

The power converters may include a plurality of power electronic switches connected in series with each other, and a capacitor connected in parallel with the power electronic switches.

In accordance with another aspect of the present invention, a method of converting power is provided. The method includes: allocating phase angles to a plurality of sub-units, respectively, by a central controller; individually creating local switching carriers based on the allocated phase angles, by the respective sub-units; and controlling switching of power converters corresponding to the respective sub-units according to a result of a comparison of the individually created local switching carriers and a reference AC voltage, by the respective sub-units.

The power converters may configure at least one phase leg, and, when M power converters are included in the phase leg, the central controller may allocate the phase angles such that differences between the allocated phase angles are multiples of 2π/M.

The power converters included in the phase leg may be connected in series with each other.

The phase leg may be arranged between a DC connection terminal and an AC connection terminal.

The controlling of the switching may include comparing the local switching carriers with the reference AC voltage, and controlling the switching of the power converters corresponding to the respective sub-unit according to the result of the comparison.

The power converters may include a plurality of power electronic switches connected in series with each other, and a capacitor connected in parallel with the power electronic switches.

As described above, the present invention provides an apparatus and a method for converting power which can precisely control switching time points of power converters included in a multilevel converter.

Furthermore, according to the embodiments of the present invention, switching time points of power converters included in a multilevel converter can be controlled only with a small amount of operation.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, an embodiment of the present invention will be described in detail with reference to the accompanying drawings.

Figure 1:
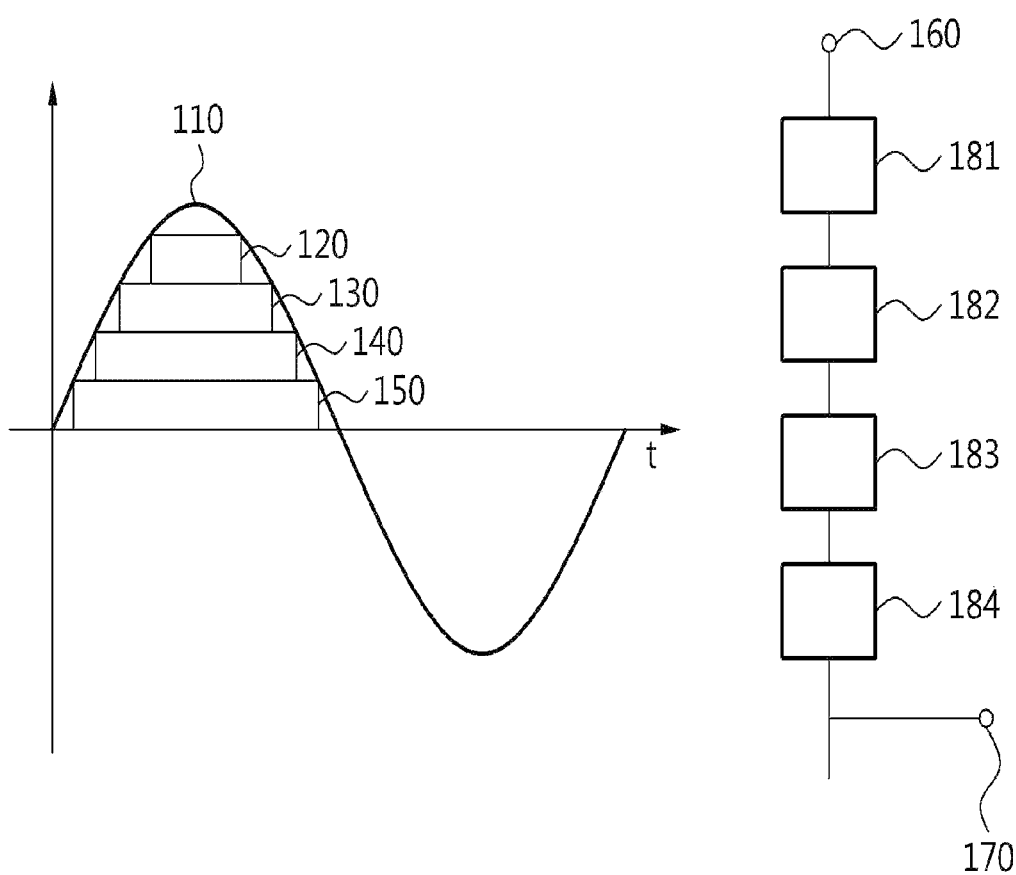
FIG. 1 is a view illustrating a concept of a multilevel converter for converting power by switching a plurality of power converters.

FIG. 1 is a view illustrating a concept of a multilevel converter for converting power by switching a plurality of power converters.

The multilevel converter converts Direct Current (DC) into Alternating Current (AC), and alternating current into direct current using the plurality of power converters. According to an aspect, the multi-level converter may include a plurality of power converters 181, 182, 183, and 184 connected in series with each other as illustrated in FIG. 1.

According to an aspect, the multilevel converter may include a plurality of phase legs, and each of the phase legs may include the plurality of power converters 181 to 184. The phase leg may be arranged between a DC terminal 160 and an AC terminal 170 to convert direct current into alternating current, or alternating current into direct current. In this case, an output of the phase leg may be the sum of outputs of the respective power converters 181 to 184.

According to an aspect, each of the power converters 181 to 184 may simply produce direct current. However, the output of the phase leg, which is the sum of the outputs of the respective power converters 181 to 184, may have the form of alternating current through precisely controlling the switching time points of the respective power converters 181 to 184.

A waveform 110 of alternating current illustrated in FIG. 1 may be obtained by approximating the output of the phase leg. The output 110 of the phase leg is configured by the sum of an output 150 of a first power converter, an output 140 of a second power converter, an output 130 of a third power converter, and an output 120 of a fourth power converter.

When the power converters 181 to 184 are switched from a deactivated state to an activated state, the respective power converters 181 to 184 produce the outputs. Accordingly, in order to configure the waveform 110 of alternating current by synthesizing the outputs of the respective power converters 181 to 184, the switching time points of the respective power converters 181 to 184 have to be precisely controlled.

Figure 2:
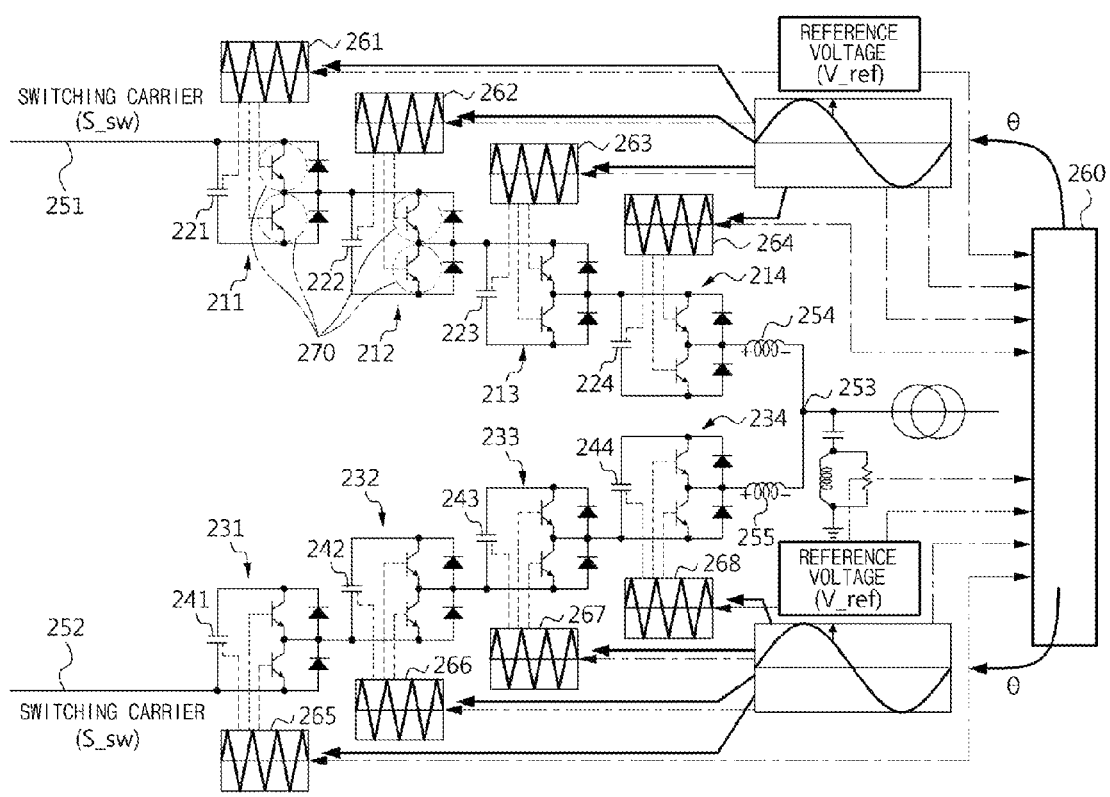
FIG. 2 is a circuit diagram illustrating a structure of a power converting apparatus according to an exemplary embodiment of the present invention.

FIG. 2 is a circuit diagram illustrating a structure of a power converting apparatus according to an exemplary embodiment of the present invention.

The power converting apparatus includes a plurality of phase legs, each of which includes a plurality of power converters. Furthermore, in order to control switching time points of the power converters 211 to 214 and 231 to 234, the power converting apparatus further includes a central controller 260 and sub-units 261 to 268 corresponding to the respective power converters 211 to 214 and 231 to 234.

According to an aspect, the central controller 260 generates a reference AC voltage. The central controller 260 transmits the generated reference AC voltage to the sub-units 261 to 268. Furthermore, the central controller 260 may allocate phase angles to the respective sub-units 261 to 268. The central controller 260 transmits the allocated phase angles to the respective sub-units 261 to 268.

The sub-units 261 to 268 may individually create local switching carriers based on the received phase angles. According to an aspect, the respective sub-units 261 to 268 may create the local switching carriers having the same frequency. That is, the local switching carriers created by the respective sub-units 261 to 268 are sinusoidal waves having the same frequency and the phase angles determined under the control of the central controller 260.

The respective sub-units 261 to 268 may control the power converters 211 to 214 and 231 to 234 such that the power converters 211 to 214 and 231 to 234 corresponding to the respective sub-units 261 to 268 are switched at intersection time points of the created local switching carriers and the reference AC voltage.

Although the respective local switching carriers have the same frequency, the phase angles thereof may be different from each other. Accordingly, the intersection time points of the respective local switching carriers and the reference AC voltage may be different from each other depending on the respective sub-units 261 to 268. Thus, switching time points of the power converters 211 to 214 and 231 to 234 corresponding to the respective sub-units 261 to 268 are determined to be different from each other.

According to an aspect, the switching time points of the respective power converters 211 to 214 and 231 to 234 may be determined such that the sum of outputs of the power converters 211 to 214 and 231 to 234 approximates to the AC waveform as illustrated in FIG. 1.

As illustrated in FIG. 2, each of the power converters 211 to 214 and 231 to 234 may include a plurality of power electronic switches 270 connected in series with each other. In this case, the respective power converters 211 to 214 and 231 to 234 may include capacitors 221 to 224 and 241 to 244 connected in parallel with the power electronic switches 270 which are connected in series with each other.

According to the embodiment illustrated in FIG. 2, the central controller 260 allocates the phase angles to the respective sub-units 261 to 268 and generates the reference AC voltage, and the local switching carriers are created by the individual sub-units 261 to 268 having received the phase angles.

That is, the creation of the local switching carriers and the comparison of the local switching carriers and the reference AC voltage for the individual sub-units 261 to 268 are carried out by the respective sub-units 261 to 268, thereby reducing a burden of an operation for the central controller. Accordingly, precise control can be made using only the simple control algorithm.

Figure 3:
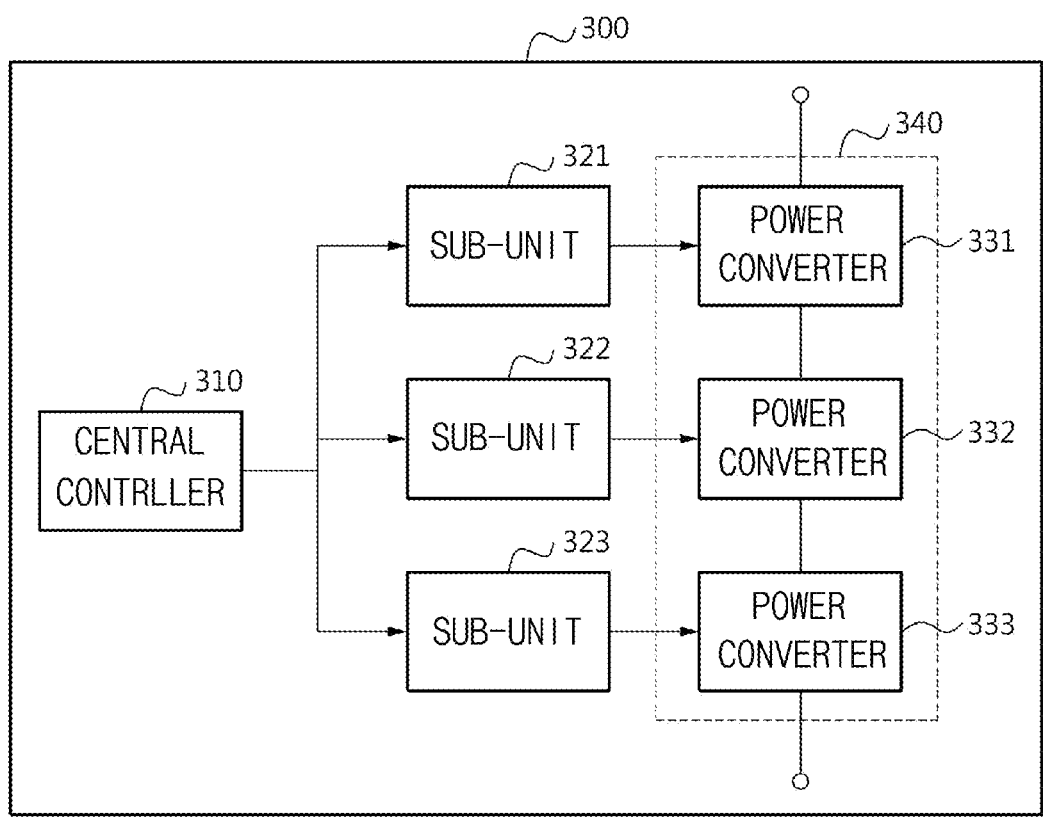
FIG. 3 is a block diagram illustrating a structure of a power converting apparatus according to an exemplary embodiment of the present invention.

FIG. 3 is a block diagram illustrating a structure of a power converting apparatus according to an exemplary embodiment of the present invention.

The power converting apparatus 300 may include a central controller 310, sub-units 321 to 323, and power converters 331 to 333.

The central controller 310 generates a reference AC voltage. The central controller 310 transmits the generated reference AC voltage to the sub-units 321 to 323. That is, the reference AC voltage is common in the sub-units 321 to 323. According to an aspect, the reference AC voltage may be a sinusoidal wave.

Furthermore, the central controller 310 allocates phase angles to the respective sub-units 321 to 323. According to an aspect, the central controller 310 may allocate the phase angles to the sub-unit 321 to 323 such that the sum of outputs created by the respective power converters 331 to 333 to be switched by controlling the sub-units 321 to 323 has the AC waveform.

The sub-units 321 to 323 receive the reference AC voltage and the phase angles. The respective sub-units 321 to 323 create local switching carriers using the received phase angles. According to an aspect, the local switching carriers may be the same frequency of sinusoidal waves having different phases depending on the phase angles allocated by the central controller 310.

The respective sub-units 321 to 323 compare the reference AC voltage with the created local switching carriers, and control switching of the power converters 331 to 333 corresponding to the respective sub-units 321 to 323 according to the result of the comparison.

According to an aspect, every time the local switching carriers intersect with the reference AC voltage, the respective sub-units 321 to 323 may control the power converters 331 to 333 to be switched.

According to an aspect, the plurality of power converters 331 to 333 may configure one phase leg 340. The power converters 331 to 333 included in the phase leg 340 may be connected in series with each other. The phase leg 340 is arranged between a DC connection terminal and an AC connection terminal of the power converting apparatus.

According to an aspect, the phase leg 340 may include M power converters. In this case, the central controller 310 may allocate the phase angles to the sub-units 321 to 323 such that differences between the phase angles allocated to the respective sub-units 321 to 323 are multiples of $2\pi/M$.

According to an aspect, each of the power converters 331 to 333 may include a plurality of power electronic switches. Each of the power electronic switches may be an element in which a transistor and a diode are connected in parallel with each other. Furthermore, the power electronic switches included in each of the power converters 331 to 333 may be connected in series with each other. Moreover, each of the power converters 331 to 333 may include a capacitor connected in parallel with the power electronic switches which are connected in series with each other.

Figure 4:
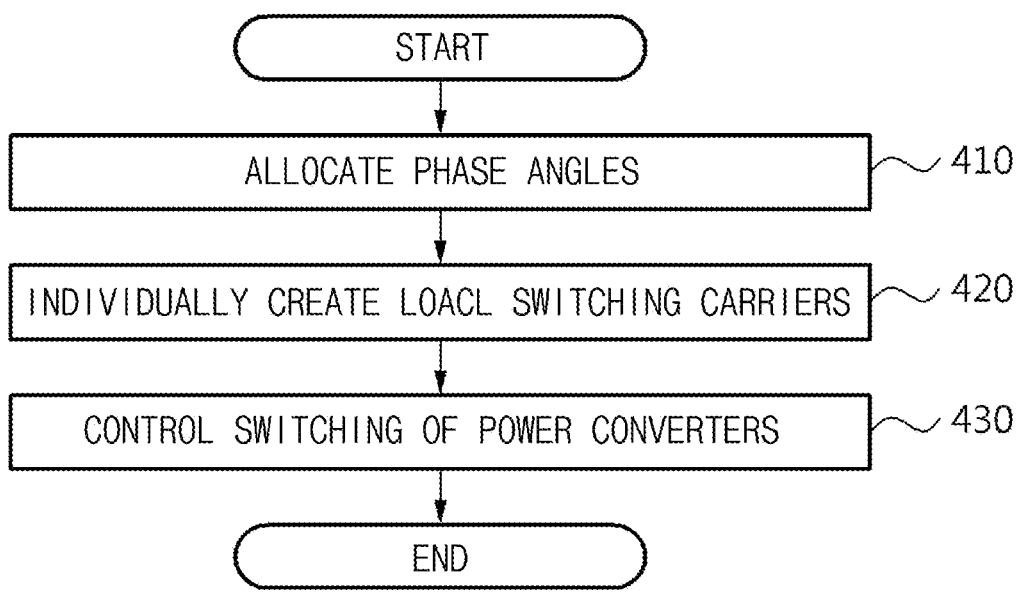
FIG. 4 is a flowchart illustrating a power converting method according to an exemplary embodiment of the present invention.

FIG. 4 is a flowchart illustrating a power converting method according to an exemplary embodiment of the present invention.

In step 410, a central controller generates a reference AC voltage. The central controller transmits the generated reference AC voltage to sub-units. That is, the reference AC voltage is common in the sub-units. According to an aspect, the reference AC voltage may be a sinusoidal wave.

In step 410, the central controller allocates phase angles to the respective sub-units. According to an aspect, the central controller may allocate the phase angles to the respective sub-units such that the sum of outputs created by the respective power converters to be switched by controlling the sub-units has the AC waveform.

In step 420, the respective sub-units receive the reference AC voltage and the phase angles. The respective sub-units create local switching carriers using the received phase angles. According to an aspect, the local switching carriers may be the same frequency of sinusoidal waves having different phases depending on the phase angles allocated by the central controller.

In step 430, the respective sub-units compare the reference AC voltage with the created local switching carriers, and controls switching of the power converters corresponding to the respective sub-units according to the result of the comparison.

According to an aspect, every time the local switching carriers intersect with the reference AC voltage, the respective sub-units may control the power converters 331 to 333 to be switched.

According to an aspect, the plurality of power converters may configure one phase leg. The power converters included in the phase leg may be connected in series with each other. The phase leg is arranged between a DC connection terminal and an AC connection terminal of the power converting apparatus.

According to an aspect, the phase leg may include M power converters. In this case, the central controller may allocate the phase angles to the sub-units such that differences between the phase angles allocated to the respective sub-units are multiples of $2\pi/M$.

According to an aspect, each of the power converters may include a plurality of power electronic switches. Each of the power electronic switches may be an element in which a transistor and a diode are connected in parallel with each other. Furthermore, the power electronic switches included in each of the power converters may be connected in series with each other. Moreover, each of the power converters may include a capacitor connected in parallel with the power electronic switches which are connected in series with each other.

The methods according to the embodiments of the present invention may be implemented in the form of a program command which may be executed through various computer means, and may be recorded in a computer readable medium. The computer readable medium may include a program command, a data file, a data structure, and the like independently or in combination. The program command recorded in the medium may be things specially designed and configured for the present invention, or things that are well known to and can be used by those skilled in the computer software related art.

Although the present invention has been described by the restricted embodiments and the drawings as described above, the present invention is not limited to the aforementioned embodiments, and various modifications and alterations can be made from the descriptions by those skilled in the art to which the present invention pertains.

Accordingly, the scope of the present invention should not be determined by the above-described embodiments, and should be determined by not only the following claims but also their equivalents.

What is claimed is:

1. An apparatus for converting power comprising:
   a central controller that generates a reference AC voltage;
   a phase leg including a plurality of power converters; and
   a plurality of sub-units,
   wherein the central controller allocates respective different phase angles to the respective sub-units, and the respective sub-units individually create local switching carriers based on the allocated phase angles, and controls switching of the power converters corresponding to the respective sub-units according to a result of a comparison of the individually created local switching carriers and the reference AC voltage,
   wherein the local switching carriers created by the respective sub-units are sinusoidal waves each having a same frequency and the respective different phase angle from each other allocated by the center controller, and
   wherein, when the number of the power converters is M, a difference between any two of the allocated phase angles is a multiple of $2\pi/M$.

2. The apparatus of claim 1, wherein the power converters included in the phase leg are connected in series with each other.

3. The apparatus of claim 1, wherein the phase leg is arranged between a DC connection terminal and an AC connection terminal.

4. The apparatus of claim 1, wherein the respective sub-units control the switching of the power converters corresponding to the respective sub-unit when the local switching carriers intersect with the reference AC voltage.

5. The apparatus of claim 1, wherein the power converters comprise a plurality of power electronic switches connected in series with each other, and a capacitor connected in parallel with the power electronic switches.

6. A method of converting power, comprising:
allocating different phase angles to a plurality of sub-units, respectively, by a central controller;
individually creating local switching carriers based on the allocated phase angles, by the respective sub-units; and
controlling switching of power converters included in a phase leg and corresponding to the respective sub-units according to a result of a comparison of the individually created local switching carriers and a reference AC voltage, by the respective sub-units,
wherein the local switching carriers created by the respective sub-units are sinusoidal waves each having a same frequency and the respective different phase angle from each other allocated by the center controller, and
wherein, when the number of the power converters is M, a difference between any two of the allocated phase angles is a multiple of $2\pi/M$.

7. The method of claim 6, wherein the power converters included in the phase leg are connected in series with each other.

8. A non-transitory computer readable recording medium in which a program for executing the method of claim 7 is recorded.

9. The method of claim 6, wherein the phase leg is arranged between a DC connection terminal and an AC connection terminal.

10. A non-transitory computer readable recording medium in which a program for executing the method of claim 9 is recorded.

11. The method of claim 6, wherein the controlling of the switching comprises:
controlling the switching of the power converters corresponding to the respective sub-unit when the local switching carriers intersect with the reference AC voltage.

12. A non-transitory computer readable recording medium in which a program for executing the method of claim 11 is recorded.

13. The method of claim 6, wherein the power converters comprise a plurality of power electronic switches connected in series with each other, and a capacitor connected in parallel with the power electronic switches.

14. A non-transitory computer readable recording medium in which a program for executing the method of claim 13 is recorded.

15. A non-transitory computer readable recording medium in which a program for executing the method of claim 6 is recorded.

* * * * *